United States Patent [19]
Brevko et al.

[11] 3,724,164
[45] Apr. 3, 1973

[54] SHRINK-WRAPPING APPARATUS

[75] Inventors: Robert Brevko, Bridgeville, Pa.; Michael P. Bitsura, Duluth, Minn.; John R. Mucka, Pittsburgh; Peter Zinski, Carnegie, both of Pa.

[73] Assignee: Ruburn Engineering, Inc., Pittsburgh, Pa.

[22] Filed: July 17, 1970

[21] Appl. No.: 55,890

[52] U.S. Cl. ..............53/229, 53/182, 53/379, 156/475, 156/492
[51] Int. Cl. ....B65b 11/48, B65b 49/08, B65b 51/14
[58] Field of Search....53/33, 39, 182, 209, 218, 229, 53/230, 378, 379; 156/475, 476, 479, 480, 492

[56] References Cited

UNITED STATES PATENTS

| | | | |
|---|---|---|---|
| 3,191,356 | 6/1965 | Zelnick et al. | 53/372 X |
| 3,357,151 | 12/1967 | Monaghan | 53/180 X |
| 3,529,711 | 9/1970 | Moeller | 53/159 X |
| 3,553,935 | 1/1971 | Woods | 53/209 |
| 2,765,838 | 10/1956 | Brown | 156/475 X |
| 3,237,373 | 3/1966 | Lewis | 53/218 X |
| 3,374,598 | 3/1968 | Piroutek | 53/33 |
| 3,490,194 | 1/1970 | Monaghan | 53/182 X |

*Primary Examiner*—Granville Y. Custer, Jr.
*Assistant Examiner*—Neil Abrams
*Attorney*—Parmelee, Ultzer & Welsh

[57] ABSTRACT

Apparatus is disclosed for wrapping an object or stack of objects in shrink wrap plastic sheets wherein an upper plastic sheet and a lower plastic sheet are brought together and heat seamed across their full width. The object to be wrapped is conveyed against the fused sheets and then moves on with the two sheets unwinding from their respective rolls, one being under the object and the other draped over it. At the trailing end of the object, the two sheets are heat seamed together along spaced parallel lines and severed between the two lines. The margins of the bottom sheet ate folded up to overlap the down-draped margins of the upper sheet at each side of the object and the overlapped edges tack-fused or welded along the sides of the package, which is then ready to be placed in a shrink tunnel.

4 Claims, 19 Drawing Figures

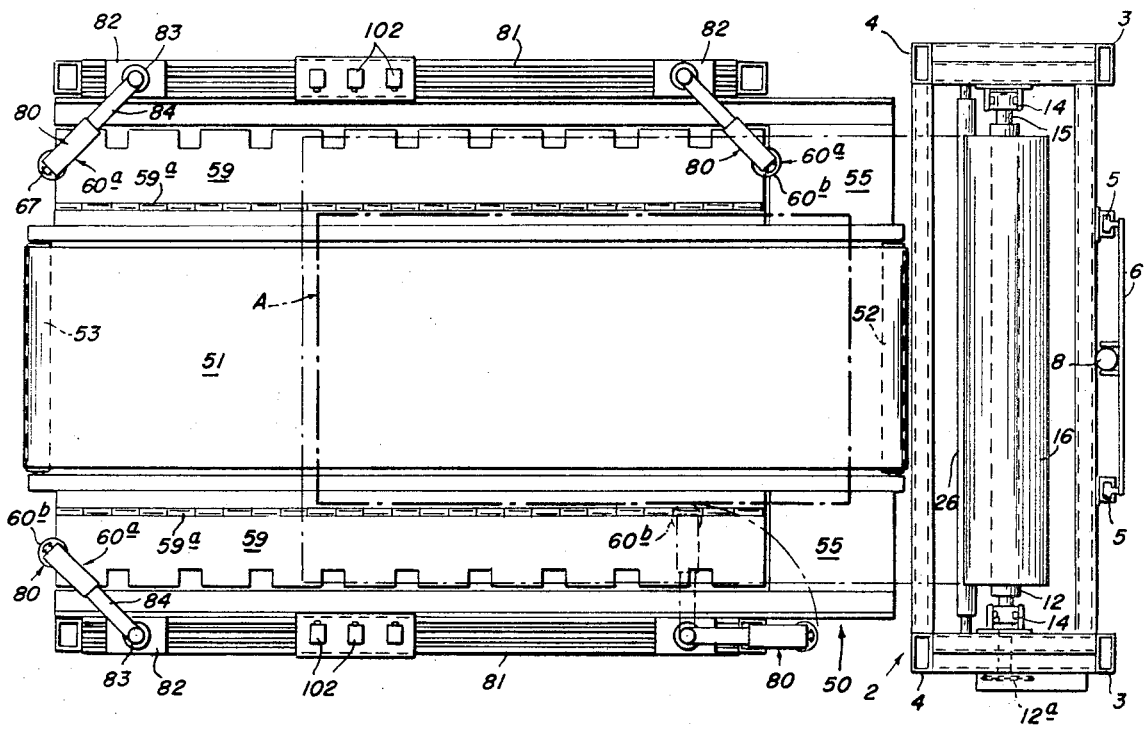
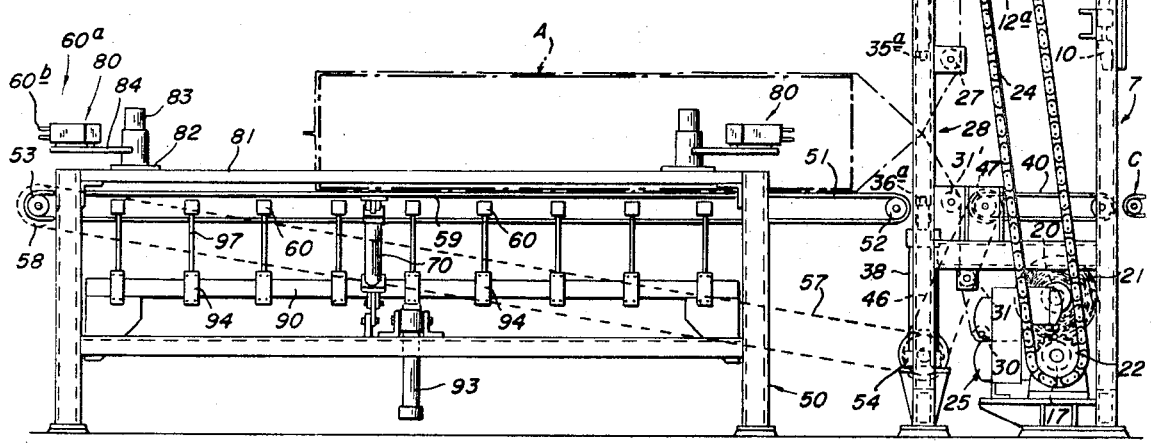
INVENTORS
ROBERT BREVKO,
MICHAEL P. BITSURA,
JOHN R. MUCKA and
PETER ZINSKI
By Parmelee, Utzler & Welsh
their Attorneys

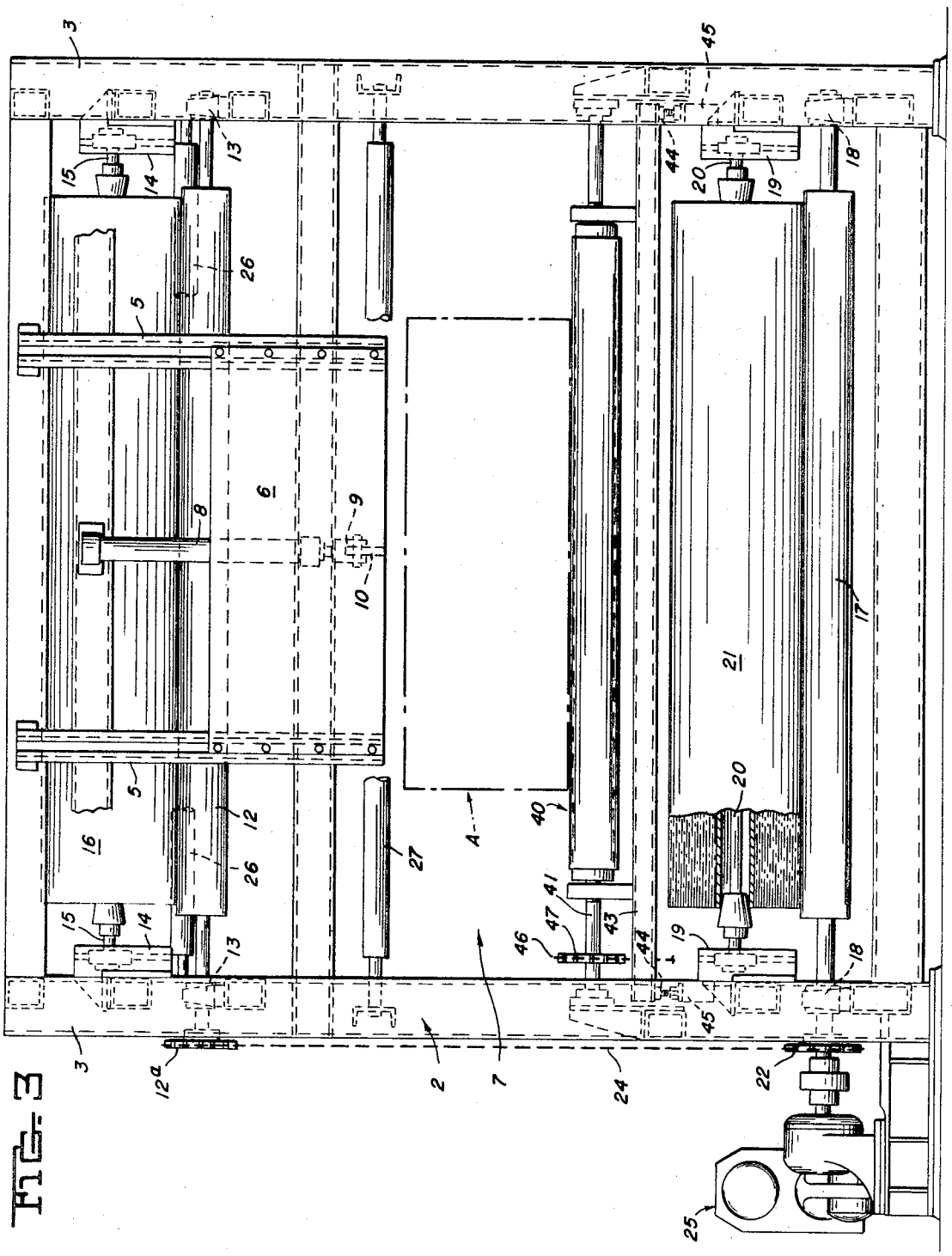

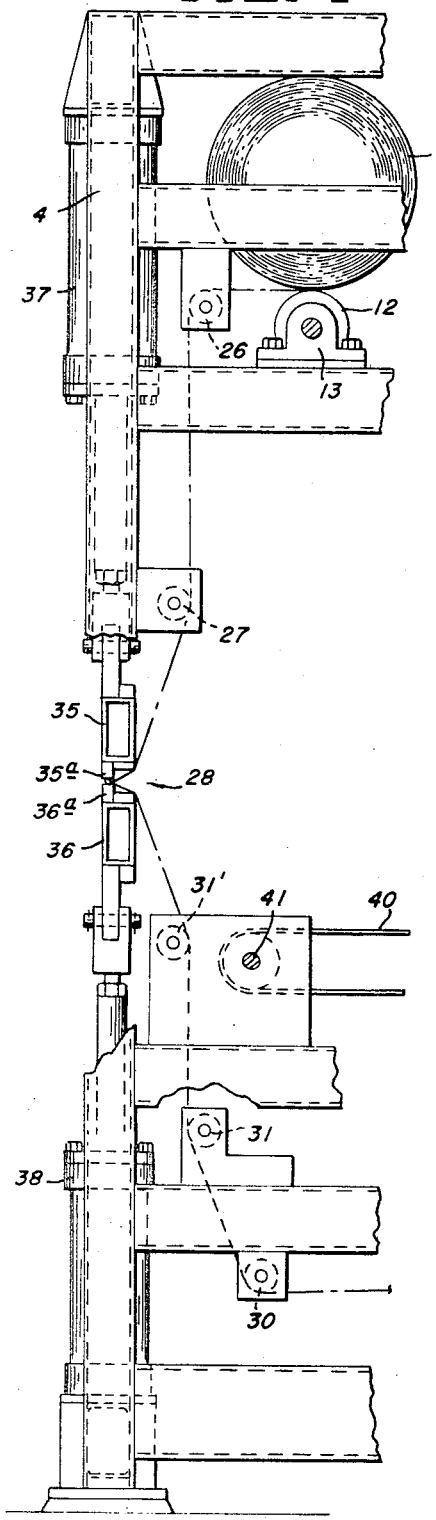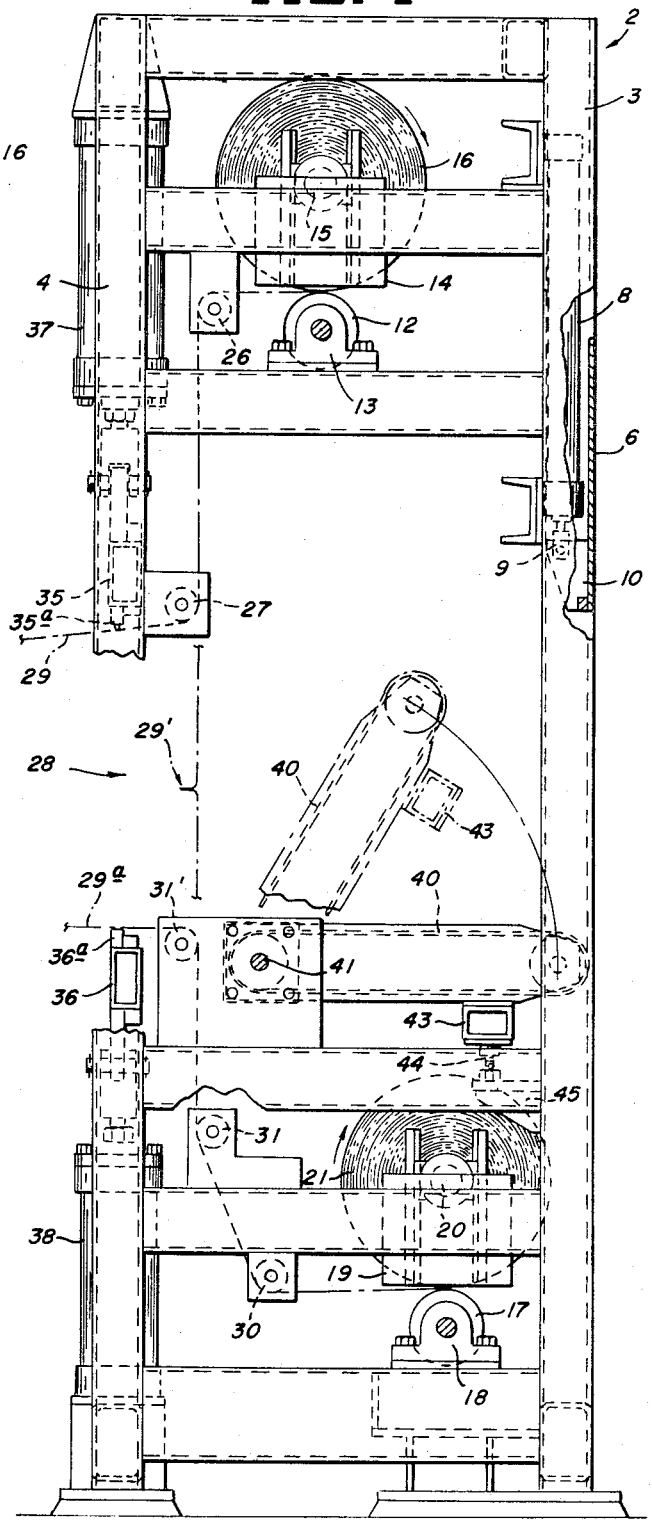

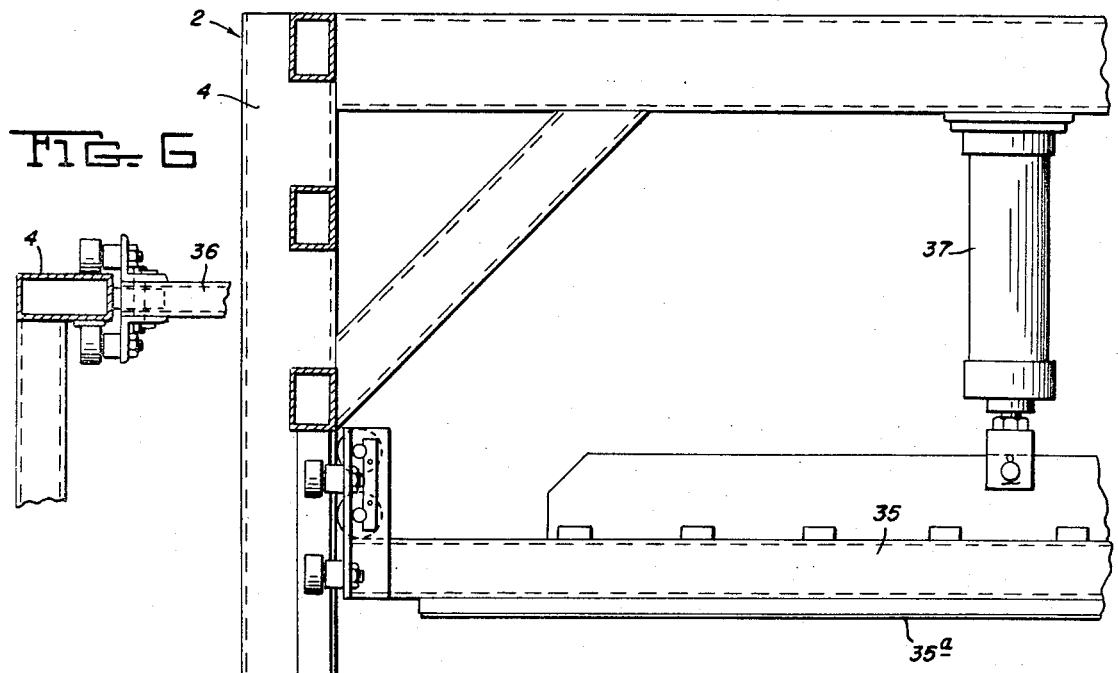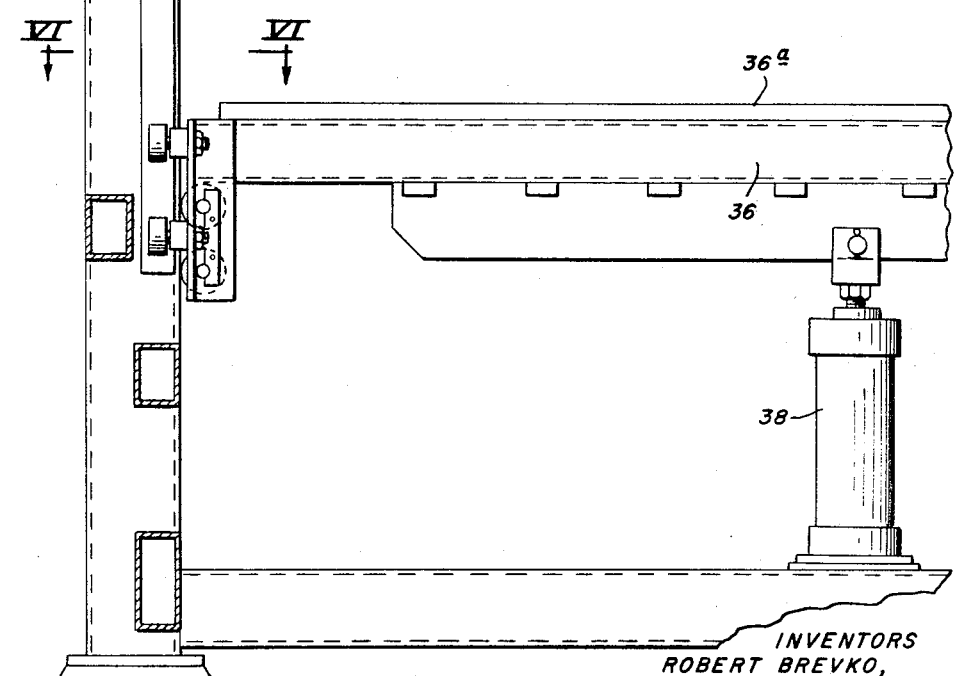

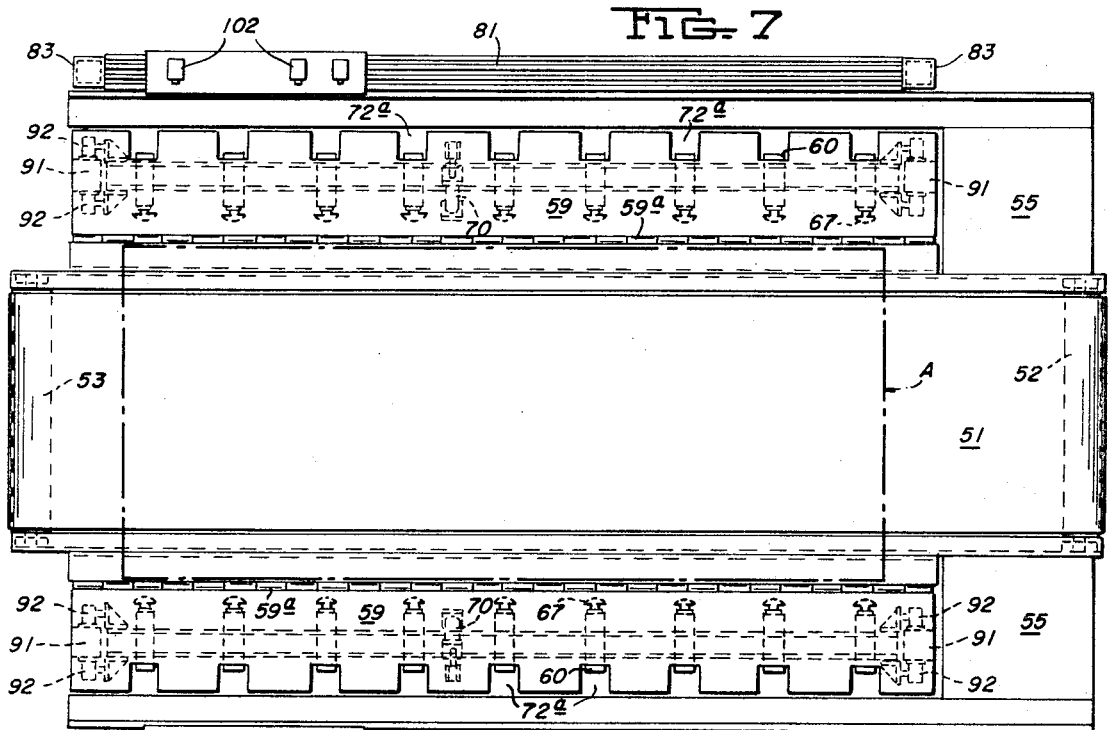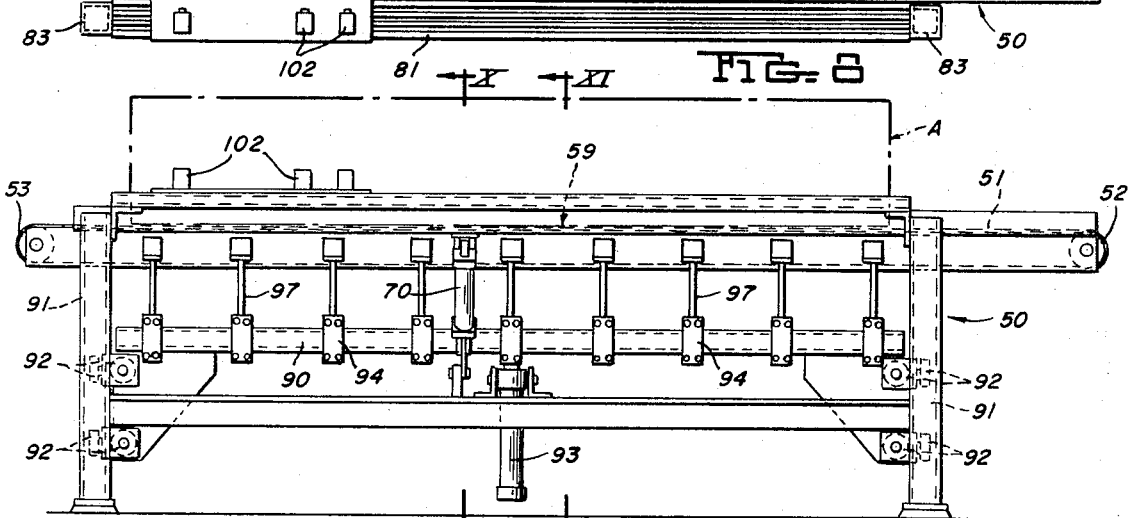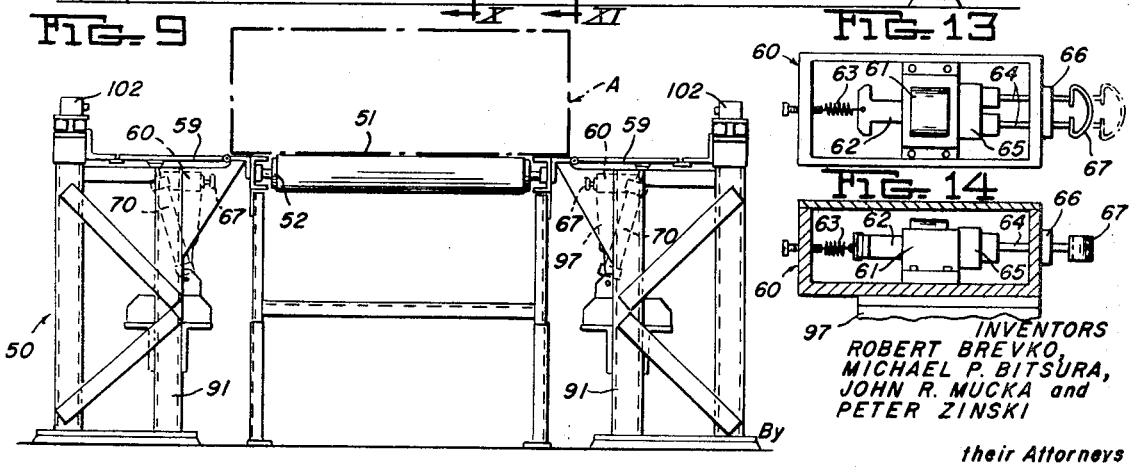

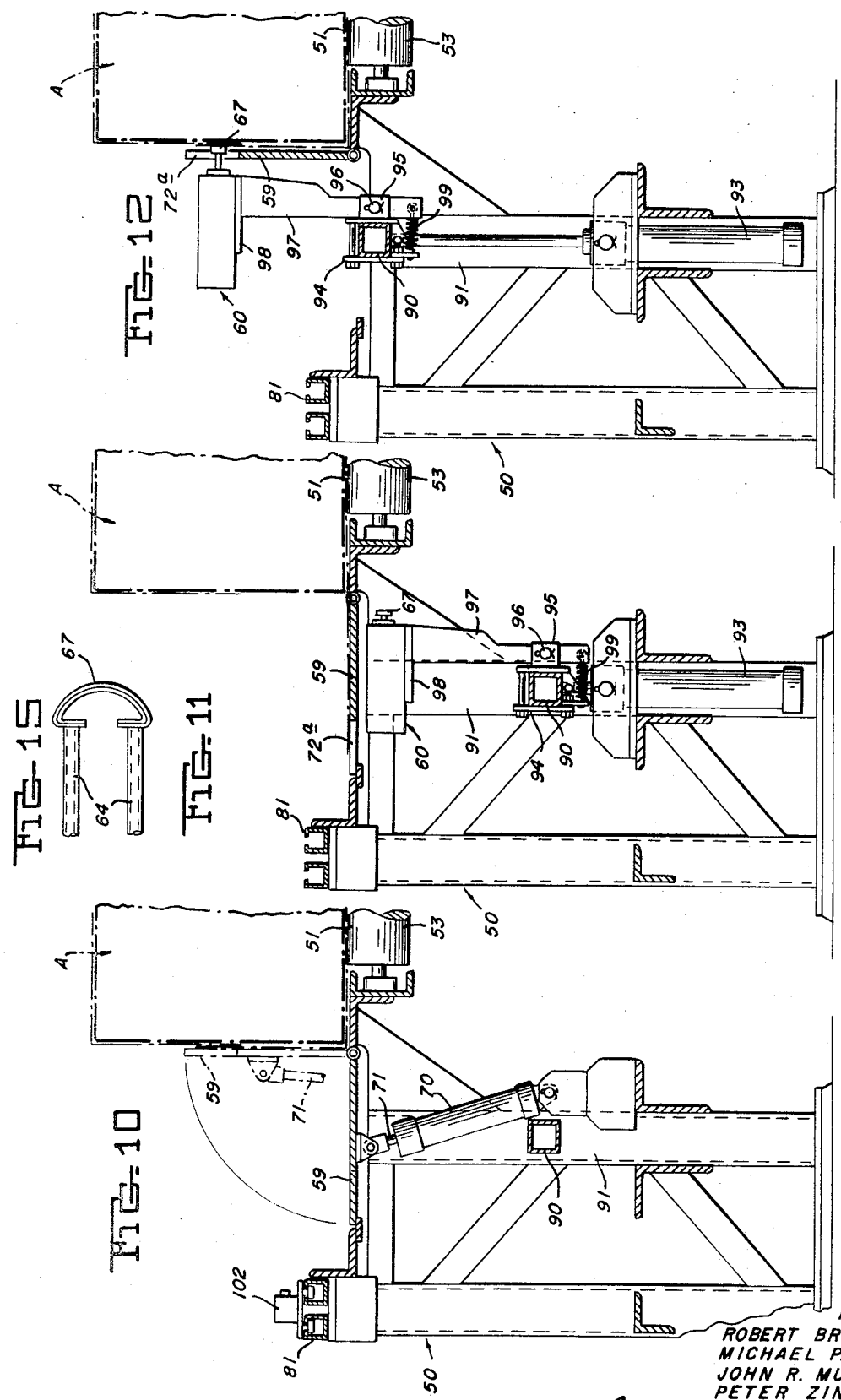

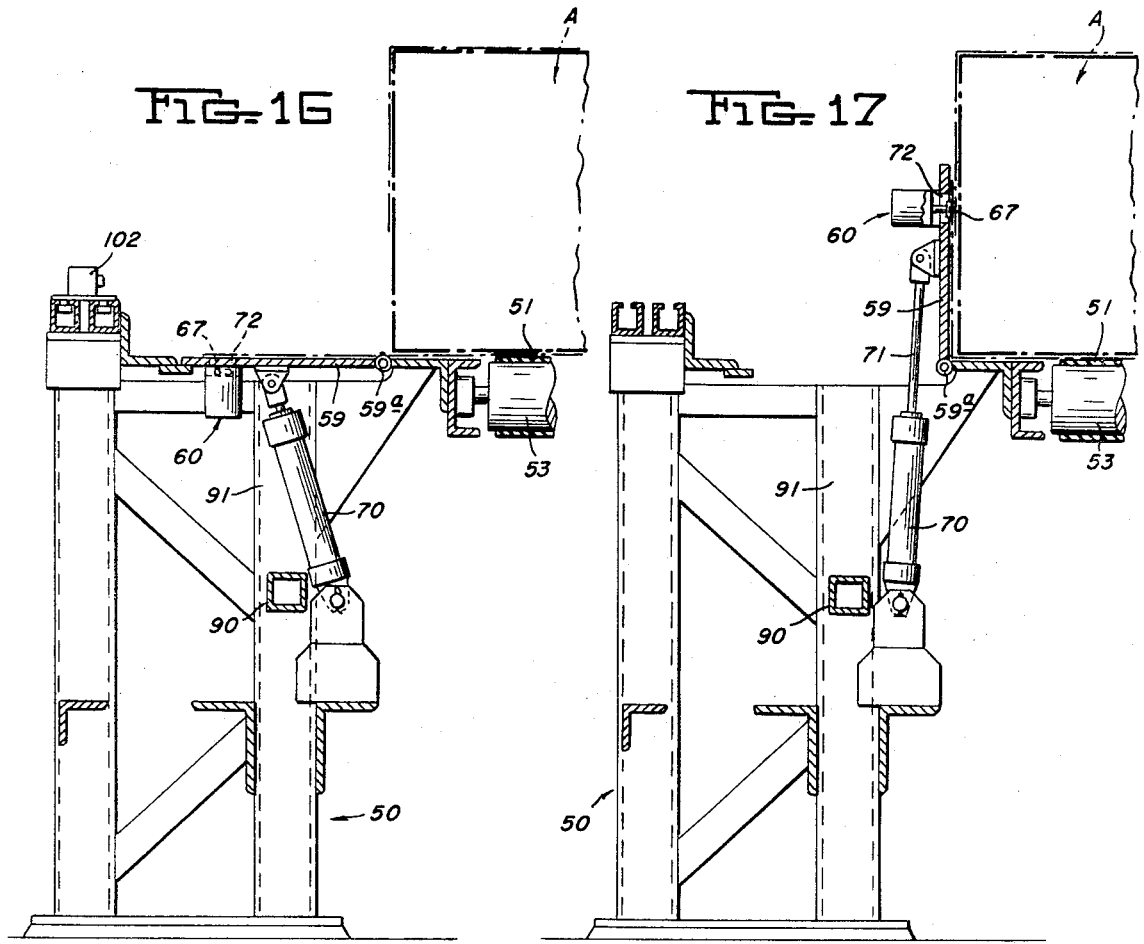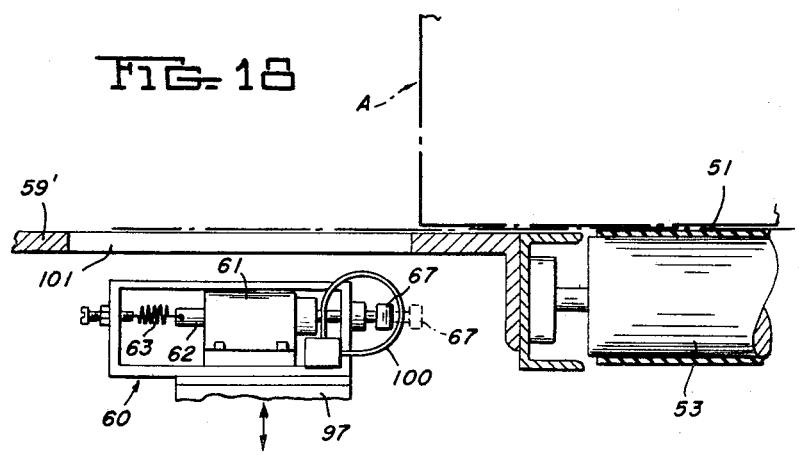

SHRINK-WRAPPING APPARATUS

This invention is for a method and apparatus for shrink-wrapping an object or assembly of objects in a plastic film ready for insertion into a shrink wrap tunnel for completing the sealing of the wrapper. It is especially useful for wrapping a bundle of slab like objects or rectangular bundles, but is applicable to various objects and shapes.

This invention is especially designed for the automatic or semi-automatic enclosing of a large number of similar bundles or objects in succession in shrink-wrap plastic film in rapid succession and with little manual labor.

According to our invention, an apparatus is disclosed in which a stack or bundle of separate slab-like articles approaching the machine first strikes an abutment plate that squares the leading end of the stack. Then the front end moves against a vertical film of plastic wrapping sheeting extending across its path of travel, the film being comprised of a lower sheet delivered from a bottom roll and an upper sheet delivered from an upper roll, with the ends of the sheets being joined together at about the level of the mid-plane of the stack to be wrapped. As the stack is carried along horizontally on a conveyor with its front end pushing against the welded sheets, the sheets unwind from the upper and lower rolls, the lower sheet being under the bundle and the upper sheet lying on top of it with its side edges draping down at the sides of the bundle. When the stack or bundles reaches a predetermined position, upper and lower transverse cutting and heat-sealing bars move together vertically, sealing the top and bottom sheets of plastic at the trailing end of the bundle into a transverse seam, cutting the sheets rearwardly of this seam, and sealing the sheets immediately to the rear of the cut to form a continuous film to be contacted by the leading end of the next bundle to be wrapped.

The now partially enclosed stack or package being sealed at the leading and trailing ends between the upper and lower film sheets is then heat-sealed along each side by folding the side areas or margins of the lower sheet up against the sides of the stack, thus overlapping the downwardly-draping marginal edges of the upper sheet, after which multiple heat-sealing elements tack-weld the overlapping edges along each side of the stack or bundle. The now entirely-wrapped bundle is ready for removal from the wrapping apparatus to be run through a shrink-wrap oven. Horizontally swinging arms or "ROTAK" units may be provided to fold the ends of the joined wrapping sheets in against the sides of the corners of the bundle and tack them in place. Although the wrapper is originally somewhat loose, it will shrink tightly about the bundle in a shrink tunnel.

The machine accomplishes the wrapping of large packages on all six sides and is designed so that the various operations are performed in succession. As constructed, it is arranged to be semi-automatic or fully automatic through the use of conventional electric circuitry, which, however, is not shown. The wrapping of a bundle by the method of first heat sealing two films together at the front end of the bundle, then pulling one sheet along under the bundle and the other along over the top until the full length of the bundle is enclosed and then making spaced parallel heat seams at the trailing end of the package and finally bringing the sides of the two sheets into overlapping relation and tack welding them is novel and efficient.

FIG. 1 is a plan view of a shrink-wrapping machine embodying the present invention;

FIG. 2 is a side elevation view of the shrink-wrapping machine of FIG. 1;

FIG. 3 is an enlarged elevation view of the right end of the machine of FIGS. 1 and 2 with certain parts being cut away to show details of construction;

FIG. 4 is an enlarged side elevation view of the front section of the machine with certain parts being cut away to show details of construction, and showing the upper and lower cutting bars in their retracted positions;

FIG. 4a is a partial view of the front section of FIG. 4 showing the left side thereof, with certain parts being cut away to show details of construction, and showing the upper and lower cutting bars in their engaged or cutting and sealing positions;

FIG. 5 is an enlarged partial sectional view of the front section of the machine and looking towards the rear thereof, with certain elements deleted, and showing details of construction of the upper and lower cutting bar assemblies;

FIG. 6 is a view looking along the line VI—VI of FIG. 5;

FIG. 7 is a plan view of the left end section of the machine showing in greater detail the tacking unit arrangement shown in FIGS. 1 and 2;

FIG. 8 is a side elevational view of the left end section shown in FIG. 7;

FIG. 9 is a view of the right end of the section shown in FIG. 8;

FIG. 10 is a view looking along the line X—X of FIG. 8;

FIG. 11 is a view looking along the line XI—XI of FIG. 8 and showing a tacking unit in its inactive position;

FIG. 12 is a view similar to that of FIG. 11 and showing the tacking unit in its active position engaging the overlapping sides of wrapping sheets around a bundle;

FIG. 13 is a plan view looking into a tacking unit as would be used in the embodiment of the machine of this invention as shown in FIGS. 7–12;

FIG. 14 is a side elevational view, partly in section, of the tacking unit of FIG. 13;

FIG. 15 is an enlarged plan view of the tacking element of the unit of FIGS. 13 and 14;

FIG. 16 is a partial sectional end view looking towards the rear end of a shrink-wrapping machine of the present invention, showing yet another tacking unit arrangement with the unit in its inactive position;

FIG. 17 is a view similar to that of FIG. 16 showing the tacking unit in its active position engaging overlapping sides of wrapping sheets around a bundle; and FIG. 18 is a partial sectional end view of a shrink-wrapping machine of the present invention showing still another tacking unit arrangement with the unit in its inactive position.

Referring first to FIGS. 1, 2, and 3 particularly, the machine comprises first an upright frame 2, having corner uprights 3 at the front and corner uprights 4 at the back with various horizontal structural members securing them together. At the front of the machine, which is at the right as viewed in FIGS. 1 and 2, there are spaced vertical guide channels 5 providing guide means for a vertically-movable abutment plate 6 which is moved from the normally raised position shown in FIG. 3 to a lowered position where it obstructs the passage into the opening 7 at the front of the machine. The plate 6 is moved up and down by a fluid pressure cylinder and piston unit 8, the unit having a clevis 9 at the end of the piston rod which is attached to a lug 10 at the bottom edge of the plate, as best seen in FIG. 3.

Since the machine will frequently be used for wrapping a stack of flat plate-like objects, or a bundle of slab-like objects, which are carried to the wrapping machine on a conveor C at the front of the machine, the abutment plate is provided to obstruct the bundle or stack of loose pieces and square the leading edge by contact with the plate, and also restrain the stack from entering the machine until a preceding bundle has been wrapped and removed.

In the upright frame at a level above and to the rear of the opening 7 there is a supporting and sheet-feeding roll 12, the ends of which are supported in fixed bearings 13. Above the bearing 13 there are vertical journal guides 14 for the shafts 15 of a roll 16 of vinyl of other shrinkable plastic wrapping film or sheet, the arrangement being such that roll 16 rests on supporting feed roll 12, moving down as its diameter decreases with the removal of the wrapping sheet therefrom. Roll 12 has a drive sprocket 12a at one end.

In the lower portion of the frame below the bottom of the opening 7 there is a similar arrangement comprising a fixed feed roll 17 having its end shafts in fixed bearings 18. Above the bearings 18 are vertical journal guides 19 into which shafts 20 at the ends of roll 21 of wrapping sheet are received with the roll 21 resting on the supporting feed roll 17, the roll 21 being free to move down by gravity as its diameter decreases.

Sprocket 12a at one end of the shaft of upper feed roll 12 and sprocket wheel 22 on the corresponding end of the shaft of lower feed roll 21 are operatively connected by a sprocket chain 24 which passes around these two sprocket wheels to turn both feed rolls in the same direction and at the same speed. There is a drive motor and speed-reducing gear unit 25 that drives the lower feed roll and the upper feed roll through the sprocket chain 24.

The arrangement is such that when the motor and speed-reducing gear unit 25 is operating as a driving means for the lower feed roll 21, it will also drive the upper one. Wrapping sheet from the top roll 16 is unrolled when roll 12 is rotated, and the wrapping sheet as it unrolls, passes around guide roll 26 and downwardly to guide roll 27 from whence it may be turned rearwardly through opening 28 in the frame, as indicated at 29 in FIG. 4. In like manner the wrapping sheet from the lower roll 21 is unwound when feed roll 17 is rotated, and it passes around guide roll 30, thence upwardly over guide rolls 31 and 31' and then rearwardly through opening 28 as indicated at 29a.

The upright frame structure, and especially corner post 4 at the rear side of the upright frame, provides a support and guideway for an upper heat-sealing and sheet cut-off bar 35 arranged to be moved from an upper position of travel shown in FIG. 4 to a lower position shown in FIG. 4a about half-way across the opening 28. At this lower position it meets a cooperating lower heat-sealing and cut-off bar 36 movable from a lowermost position shown in FIG. 4 to the raised position shown in FIG. 4a. The upper bar 35 is raised and lowered by a fluid pressure cylinder and piston unit 37, and the lower bar 36 by a similar unit 38. These bars are of a known construction in the art and are electrically heated with confronting edge portions 35a and 36a respectively.

At the proper time in the start-up of the operation, the lead ends 29 and 29a of the upper and lower wrapping sheets are long enough that when the sealing and cut-off bars 35 and 36 move together, the ends of the sheets will be brought together, cut and heat-sealed together back of the cut-off, as shown in FIG. 4a. Actually the edge portions of the bars are known as seal-cut-seal edges that will seal the sheets together forwardly and rearwardly of the intervening cut-off, the purpose of which will hereinafter become more apparent. At start-up, however, it is sufficient to seal the ends 29 and 29a together so that when the bars 35 and 36 are opened, there will be a web of plastic sheet extending across the opening 28 with a horizontal seam at the center as shown at 29' in FIG. 4.

In the vertical frame 2 there is an endless belt conveyor unit 40, the top reach of which is about level with conveyor C at the front of the machine and slightly above the level of lower heat seal and cut-off bar 36 when that bar is in its lowermost position. As indicated in FIG. 4, the rear shaft 41 of the unit, which is the conveyor drive shaft, is also a pivot about which the front of the belt conveyor may be moved in a vertical arc from the horizontal position shown in FIG. 4 to the dotted line raised position. The purpose of this is to enable the lower roll 21 of wrapping sheet to be inserted into its guide bearings 19 and the core removed after the roll has been exhausted to be replaced by a new roll. The conveyor belt unit includes framing members, one of which passes under the lower reach of the conveyor belt near its forward end. It has a depending support 43 that rests on an adjusting screw means 44 on a bracket 45 when the conveyor is lowered to its operating position, the screw means providing a leveling adjustment. The belt of the conveyor unit is driven by a sprocket chain 46 passing around a sprocket wheel 47 in the manner hereinafter more fully described.

There is an elongated horizontal frame located immediately to the rear of the vertical frame 2. It has a horizontally-extending endless conveyor belt 51 passing around a front roller 52 and a rear roller 53 with the top reach of this belt being on a level with the conveyor belt unit 40 when that unit is in its horizontal operating position. As seen in FIG. 1 the belt 51 is centered between the end of the roll of wrapping material 16, the roll 16, as well as the lower material roll 21, being much wider than the conveyor belts 40 and 51. There is a motor and drive gear unit 54 near the bottom of the vertical frame, which drives chain 46 to drive the belt of conveyor unit 40. This motor which drives gear unit 54 also drives sprocket chain 57 passing around a sprocket wheel 58 on the rear roller 53, the arrangement being such that the top flights of the conveyor belt units 40 and 51 travel from front to rear at the same speed. At the entry end of frame 50 horizontally arranged along each side of the belt 51 there are smooth panels 55.

OPERATION OF ENGAGING BUNDLE IN WRAPPER

The operation of the wrapping machine insofar as it has now been described may be readily followed. It may be assumed that the ends 29 and 29a of the upper and lower sheets will have been heat-sealed together by sealing bars 35 and 36 as hereinbefore described, and the sealing bars have been retracted to their full open position. The plastic wrapping sheets, joined at the center by seam 29', will extend across the frame opening 28 as indicated in dotted lines in FIG. 4. It may be assumed, purely for purposes of illustration, that a stack of rectangular slabs of foamed plastic, for example, are approaching the machine on a conveyor C. When the leading edge of the stack strikes the then lowered abutment plate 6, squaring the ends of the stack and stopping the forward travel so that if necessary the sides of the stack may be set parallel to the longitudinal axis of the conveyor. Then the gate abutment plate 6 is quickly raised and the forward end of the stack enters the machine, with the conveyor belt 40 aiding in carrying the stack forward. As the forward end of the bundle or stack reaches the joined sheets, the powerdriven feed rolls 12 and 17 are set into operation to turn the rolls of sheet-wrapping film 16 and 21 respectively to unroll the film sheets at about the same speed as the bundle A moves rearwardly. The rearwardly-moving bundle A then carries the joined sheet end 29' rearwardly or to the left as viewed in FIGS. 1 and 2, with the lower sheet 29a being carried rearwardly under the bundle and the top sheet 29 lying on top of the bundle.

Since the wrapping sheets are wider than the conveyor 51 and the bundle A, the wide margins of the lower sheet will extend onto and slide along on the side panels 55 at each side of the conveyor 51. At the same time the margins of the top sheet will drape down along the sides of the bundle. As the rear end of the bundle clears the upright frame 4, the upper and lower sealing bars 35 and 36 will be moved together to press the upper and lower sheets together as indicated by dotted lines in FIG. 2. It has been previously mentioned that the edge elements 35a and 36a of the bars 35 and 36 are "seal-cut-seal" elements. This means they will seal the converging upper and lower wrapping sheets together at the rear of the bundle A (see FIG. 2) and in the same operation seal and cut the diverging upper and lower sheets back of the bars 35 and 36, after which the bars open and the joined sheet ends at 29' extend across the opening 28 as in FIG. 4.

When the bars 35 and 36 close as just described, the drive to the film feed rolls 12 and 17 is stopped and the travel of conveyor belt 51 is stopped and the bundle is at rest between the top and bottom wrapping sheets, and the upper and lower wrapping sheets are fused together at each end of the load. At this time the bottom wrapping sheet is flat, extending laterally beyond the sides of the bundle and resting flat on the side panels. The margins of the top sheet drape down along the sides of the bundle, at least more than half the height of the bundle. The bottom wrapping sheet is as wide as the top one, so that the areas resting on the side panels can be folded up to overlap the downwardly-draped sides of the top sheet and be fused thereto, as next described.

THE SIDE FLAP CLOSING AND TACKING

When the margins of the two sheets are brought together at the two sides of the bundle, they are fused together, usually at intervals, and this fusing is referred to as "tacking." When the tacked areas are subsequently heated in a shrink chamber, they will fuse Long a continuous line. Various devices may be used to bring the margins of the sheets together and tack them.

FIGS. 13, 14, and 15 show a form of tacker unit which may be used with each of the arrangements hereinafter described for bringing the sides of the sheet into overlapping relation and tacking them at intervals as above outlined. The tacker comprises a frame 60 in which is mounted a solenoid 61 with an armature 62 that is resiliently held in its retracted position by a tension spring 63 attached to one end of the armature 62 and the frame 60. Extending forward from the opposite end of the armature are two rods 64 that are insulated from each other in an insulating block 65 on the armature, and which pass through an insulating guide block 66 in the frame 60. The outer ends of the rods 64 are connected by a resistance heater element 67 that has a convex outer surface as viewed in FIG. 13, but which is flat in transverse section as viewed in FIG. 14. Electric power from a source (not shown) is conducted through the rods 64 to the resistor or heater element 67 to maintain it at a desired temperature where it can fuse overlapping shrink-wrapping plastic sheets together without melting a hole through the sheets. When the solenoid is energized, the armature 62 will move to the right as viewed in FIGS. 13 and 14 a short distance, usually of the order of about an inch, and it will be retracted by the spring when the solenoid is de-energized.

In FIGS. 16 and 17, we have shown a simplified arrangement for the use of the tackers. In these figures side panels 59 are hinged along their inner edges to the frame of the machine at each side of the top flight of the conveyor belt 51 to normally lie in a horizontal plane, but which can be swung on its hinges at 59a to a vertical plane. There is shown a fluid pressure cylinder and piston unit 70–71 for so moving the panel 59, the cylinder 70 being pivotally anchored to the horizontal frame of the machine below the panel, and the piston rod 71 be pivotally connected to the panel 59. Along the panel is a row of spaced openings 72, these openings being so positioned that when the panel is raised to a vertical position the openings will be at about the level of the middle of the bundle. Referring to that surface of the panel which faces away from the bundle or package as the "outside" surface, it has one of the tacker units secured thereto back of each opening 72, and the heated sealing element 67 of each unit is recessed in the opening at which it is located when the armature is retracted, but it will be projected beyond the inner surface of the panel when the solenoid is energized.

With this arrangement, when the panels 59 at the opposite sides of the load are opened and the load is enveloped between the top and bottom plastic sheets as previously described, the cylinders 70 are energized to swing the panels up to a vertical position against the sides of the bundle. This folds the margins of the bottom sheet up to overlap the downwardly-draped margins of the upper sheet, whereupon the solenoids of the several tacking units are energized and their respective heating elements thrust against the overlapped sheets while the panels hold the sheets in this overlapped relation so that the sheets are tack-welded along each side of the bundle or load.

After the tacking operation is concluded, the package could be placed in a shrink-wrap furnace and the ends of the two sheets would shrink in against the ends of the bundle in a fairly satisfactory manner.

However the machine is desirably provided with a well-known corner folding units and tackers, such as a "Rotack" unit, indicated generally at 80 (FIGS. 1 and 2) arranged to fold in the ends of the wrapping sheets at each corner of the load, especially at the rear end of the package. Where corner folding units are to be used, the horizontal frame of the machine is provided with rails 81 along each side parallel with, but spaced from the outer edges of the panels 59. These rails are provided with inverted T-slots or undercut grooves. There are supporting blocks 82 adjustably fixed in the grooved rails, their position being determined by the length of the bundles which are being wrapped. Usually one machine will operate for a period of time on one size of package before requiring adjustment for another size. Each block 82 has a post 83 about which a horizontal arm 84 swings from a position parallel with the rail along which it is positioned toward the bundle to a position perpendicular to the sides of the package. The outer end of the arm 84 carries a tacker unit 60a similar to the unit 60 previously described, except that there is a guard 60b formed of two spaced curved spring wires at the outer end of the unit contacts the corner of the wrapping sheets as it swings from over the rails in toward the corner of the package, folding the corner portion of the wrapping sheets, which is wider than the bundle to be wrapped, in against the sides of the package and preventing the film from coming into contact with the heater. The unit has a solenoid and a heater unit the same as shown in FIGS. 13, 14 and 15. The heated sealing element is projected out to engage the film by passing between the guard wires 60b.

With the arrangement shown in FIGS. 16 and 17, the tacking units are operated only after the panels 59 have been lifted and the sides tacked as previously explained. In some modifications of the machine wherein side panels are stationary, the tacking elements 67 are raised through the openings in the panels and operated simultaneously with the units 60.

Since the corner sealing units are optional, details of the mechanism for operating them have not been shown, and it may be assumed that an operator moves them manually into the operating position perpendicular to the sides of the package and then returns them to an inoperative position parallel with the rails.

FIGS. 7–12 show in greater detail the tacker arrangement illustrated in FIGS. 1 and 2 with the several tacker units along each side of the load being raised and lowered independently of the hinged panels 59 at each side of the conveyor 51. In these figures the panels 59 are hinged at 59a as previously described, but instead of the panels 59 having holes 72 as previously described, there are notches 72a along the free edges thereof, that is, the edges which are remote from the respective hinges. Fluid pressure cylinder and piston units 70–71 as previously described move the respective panels on their hinges from a horizontal to a vertical position and in so doing raise the margins of the lower film sheet into overlapping relation with the downwardly-draped margins of the upper sheet, as previously explained.

Underneath the panel 59 at each side of the machine there is a beam 90 that is substantially coextensive with the length of the horizontal frame. At each end of the beam the frame has a vertical post 91. Each end of the beam has a cluster of rollers 92 thereon, two of which bear on opposite sides of post 91, and two of which bear against the face of the post that confronts the end of the beam 90 so that each beam can move up and down freely on the posts at each end without side play or end play. There is a fluid pressure cylinder and piston unit 93 under the center of each beam 90 fixed in the frame of the machine for raising and lowering the beam.

Arranged along each beam 90 at regular spaced intervals and clamped thereto at intervals by bolts are bracket assemblies 94 having ears 95 projecting therefrom that carry a pivot pin 96, the pin supporting an upright lever 97. Each lever 97 has a platform 98 at its upper end on each of which is mounted a tacking unit 60 as shown in FIGS. 13, 14 and 15 and previously described. There is a tension spring 99 attached to the lower end of each lever 97 and to the bracket 94 to yieldably hold the lever in a vertical position, but which will permit the lever to swing away from the load as the heated element 67 is thrust against the wrapping sheets lying against the side of the bundle to prevent the element 67 from pressing too firmly against the overlapped sheets.

With this arrangement, the panels 59 are first raised to a vertical position to bring the bottom wrapping sheet into overlapping relation with the top sheet as heretofore described. Then cylinder-piston unit 93 at each side of the machine is operated to raise the respective beams 90 to their upper limit of travel when the heater elements 67 will be centered behind the notches 72a in the edges of the respective panels. The solenoids of the several tacking units are then energized to project the heating elements 67 thereof through the notches to effect tack welding of the overlapped sheets at each location.

The arrangement shown in FIG. 18 may be used where the side panels 59' are not hinged, but extended in fixed positions laterally at each side of the conveyor belt and simply have openings therein through which the tacking units are raised and lowered. In this case the tacking units will lift the margins of the lower film sheet up into overlapping relation with the downwardly-draped margins of the top sheet. For this purpose the tacking units will have sheet-lifting guards associated therewith to prevent the film from prematurely contacting the heated resistor element. The tacking unit of FIG. 18 is similar to the one shown in FIGS. 13 and 14 and corresponding reference numerals have been used to indicate corresponding parts. On the unit, there is a pair of spaced vertical spring wireguard loops 100, one at each side of the path of movement of the heater element. These will serve to lift the wrapping sheets as the tacker unit is raised through the opening 101 in the fixed panel 59' and hold it against the side of the bundle being wrapped. The heater 67 will be projected to tack weld the wrapping sheets from the retracted position shown in FIG. 18 to its extended operating position when the solenoid is energized, passing between the spaced guard loops 100.

It will thus be seen that we have developed a unique machine for enclosing an object or group of objects in a heat-shrink plastic wrapping envelope by fusing together the leading edges of upper and lower wrapping sheets disposed across the path of travel of the load or bundle to be wrapped, feeding the two sheets as the bundle engages the two joined sheets and is carried forwardly by the conveyor 51 to a predetermined position when further travel is halted, the two sheets then fused together at the rear of the bundle, and severed with a fused seam forwardly and rearwardly of the shear line. With the bundle thus enclosed between upper and lower sheets fused across their full width at the front and rear of the bundle, the sheets at the sides of the bundle are overlapped and tack-welded at close intervals, with the complete sealing then taking place when the bundle is passed through a shrink oven at the usual shrink temperature.

In the description various operations may be performed in sequence by simple push button circuits or automatically through the use of conventional sequencing circuitry forming no part of this invention. In fact an adjustable electric eye control element may be adjustably fixed on the rails 81 as indicated at 102 in FIG. 1.

While we have shown and described certain present preferred embodiments of this invention and have illustrated a certain preferred method of practicing the same, it is to be distinctly understood that the invention is not limited thereto but may be otherwise variously embodied and practiced within the scope of the following claims.

We claim

1. Apparatus for applying a shrink-film wrapping to a load to be wrapped comprising:
   a. A frame having a passageway through which the loads to be wrapped are passed one at a time,
   b. an upper roll of shrink film wrapping sheet above the passageway and a lower roll of shrink film wrapping sheet below the passage,
   c. heat seam-forming means arranged to join the leading ends of said sheets together in a first transverse heat-seam at a level intermediate the top and bottom of the load to be wrapped and in advance of said load whereby the two sheets extend as a continuous web across said passageway,
   d. means arranged to support and move the load to be wrapped through the passageway and carry it beyond the passageway and in so moving contact the joined sheets and draw them along with one sheet under the load and one on top, both sheets being of the same width and wider than the load to provide a margin lengthwise along each side of the load,
   e. the said heat-seam-forming means being also arranged to bring the two sheets together at the trailing end of the load which has been so moved and form a second transverse heat-seam at the trailing end of the load and at the same level as the first and simultaneously repeat the forming of a first transverse heat-seam across the path of travel of the next load to be wrapped, said heat-seam-forming means including also means for severing the two sheets between each such second and first transverse seams that have been thus simultaneously formed,
   f. the said margins of the upper sheet folding down along the sides of the load, said means for supporting and moving the load comprising a conveyor, said apparatus also having means positioned along the conveyor at each side thereof for folding the lateral margins of the lower sheet against the sides of the load in overlapping relation to the downturned margins of the upper sheet,
   g. said means for folding the margins of a lower sheet upwardly comprising an elongate hinged plate member positioned along the conveyor at each side thereof with one opposite the other and arranged to engage and support the lateral margins of the lower sheet, and operating means arranged to swing said plate members on their respective hinges from a substantially horizontal position to a vertical position, and
   h. heat-fusing means for fusing the overlapping margins of the sheet movable with said plate members arranged to engage the edge portions of the overlapping margins while said plate members are in a vertical position to effect fusing of the overlapping margins.

2. Apparatus for wrapping a load with shrink-wrapping sheets for insertion into a shrink oven or the like, comprising:
   A. wrapping sheet-applying means for receiving in succession individual loads to be wrapped and applying the shrink film-wrapping sheets thereabout, said sheet-applying means comprising:
      a. a frame having a passage through which the loads to be wrapped are passed one at a time,
      b. an upper roll of shrink-wrapping sheet positioned in the frame above the passage and a lower roll of wrapping sheet positioned in the frame below the passage,
      c. means arranged to feed and guide the two sheets toward each other across the passage and heat-seam the leading ends thereof together whereby the two sheets so joined extend vertically across the passage,
      d. support means arranged to support and move a load to be wrapped through the passage and carry it beyond the passage to thereby contact the joined sheets and draw them along with one sheet under the object and one on top the sheets being wider than the object and of substantial equal width to provide equal margins at each side of the load,
      e. said heat-seaming means being arranged to also fuse-seam the two sheets together at the trailing end of the object and sever them, said heat-seaming means comprising upper and lower vertically-movable seal-cut-seal bars with means for moving said bars simultaneously toward and away from each other across the passage between an operative position at a level about midway between the top and bottom of the load and an inoperative position clear of the passage, B. securing means for securing the lateral margins of the two sheets together in overlapping relation against the sides of the load, said securing means including
   a. conveyor means disposed at the discharge end of said support means for receiving the load with the wrapping sheets applied thereto,
   b. folding means alongside said conveyor means at each side for engaging the lateral margins of the lower sheet and folding the same into overlapping relation with the lateral margins of the upper sheet at a level about midway between the top and bottom of the load, and
   c. fusing means for tack-fusing together the overlapping margins of the sheets when they have been so folded, said apparatus having corner-folding means at each corner of the load, each with a horizontally-swinging arm member arranged to fold the end corner portions of the wrapping sheets against the sides of the load and tack-fuse said folded end portions against the overlapping margins of the sheet at each side of the load.

3. The apparatus as set forth in claim 1 including corner folding means having horizontally swinging arm members for folding the end corner portions of the wrapping sheets against the sides of the load and for tack-fusing the end portion in place against the overlapping side margins of the sheet.

4. The apparatus as set forth in claim 1 wherein said hinged plate members have a plurality of longitudinally-spaced openings therealong though the free edges thereof; said means for fusing the overlapping margins together comprising a plurality of individual tacking units one of which is positioned at each opening for tack-fusing the margins of the overlapping sheets; said tacking units being operative through the openings in said plate members for contacting the overlapping margins of the sheet to tack-fuse them at intervals along the length of the load.

* * * * *